United States Patent [19]
Noerpel

[11] 4,246,584
[45] Jan. 20, 1981

[54] HYBRID MODE WAVEGUIDE OR FEEDHORN ANTENNA

[75] Inventor: Anthony R. Noerpel, Long Branch, N.J.

[73] Assignee: Bell Telephone Laboratories, Incorporated, Murray Hill, N.J.

[21] Appl. No.: 68,726

[22] Filed: Aug. 22, 1979

[51] Int. Cl.[3] .......... H01G 13/02
[52] U.S. Cl. .......... 343/786; 333/242
[58] Field of Search .......... 343/786, 895; 333/239, 333/242

[56] References Cited

U.S. PATENT DOCUMENTS

| | | | |
|---|---|---|---|
| 2,950,454 | 8/1960 | Unger | 333/95 |
| 3,121,206 | 2/1964 | Mandel | 333/95 |
| 3,289,121 | 11/1966 | Comte | 333/95 |
| 3,601,720 | 8/1971 | Nakahara et al. | 333/95 |
| 3,732,571 | 5/1973 | Neale | 343/786 |
| 3,754,273 | 8/1973 | Takeichi et al. | 343/786 |
| 3,771,076 | 11/1973 | Kidner et al. | 333/95 |
| 3,924,237 | 12/1975 | Fletcher et al. | 343/786 |
| 3,949,406 | 4/1976 | Yuard | 343/786 |
| 3,964,070 | 6/1976 | Drabuwitch | 343/786 |
| 4,021,814 | 5/1977 | Kerr et al. | 343/786 |
| 4,071,834 | 1/1978 | Comte | 333/95 |
| 4,097,869 | 6/1978 | Robinson | 343/786 |
| 4,106,026 | 8/1978 | Bui-Hai et al. | 343/786 |

OTHER PUBLICATIONS

Takeichi et al., "The Ring Loaded Corrugated Waveguide", IEEE Trans. on MTT, vol. MTT-19, No. 12, 12/71.

Dragone, "Reflection Transmission and Mode Conversion in a Corrugated Feed", BSTJ, vol. 56, No. 6, Jul.-Aug. 1977, pp. 835–837.

Dragone, "Characteristics of a Broadband Microwave Corrugated Feed, a Comparison Between Theory and Experiment", BSTJ, vol. 56, No. 6, Jul.-Aug. 1977.

Boyd, "Waveguide Design and Fabrication", BSTJ, vol. 56, No. 10, pp. 1873–1897.

*Primary Examiner*—David K. Moore
*Attorney, Agent, or Firm*—Erwin W. Pfeifle

[57] ABSTRACT

The present invention relates to a hybrid mode waveguide or feedhorn antenna for transforming the $TE_{11}$ mode into the $HE_{11}$ mode. The waveguide or antenna comprises a first waveguide section of uniform cross-section at the $TE_{11}$ mode entrance port which in the antenna arrangement changes to a second section which flares outward toward the antenna mouth, and a spiro-helical projection bonded with a dielectric layer to the inner surface of the waveguide or antenna. The spiro-helical projection comprises a closely spaced helically wound wire structure formed of dielectrically coated wires which in the first section decrease in gauge size in small adjacent portions thereof as the helix progresses away from the $TE_{11}$ mode entrance port and in the remainder of the helical projection, the same or decreasing gauge wire in adjacent portions can be used.

7 Claims, 6 Drawing Figures

HYBRID MODE WAVEGUIDE OR FEEDHORN ANTENNA

BACKGROUND OF THE INVENTION

1. Field of the Invention

The present invention relates to hybrid mode waveguide or feedhorn antenna and, more particularly, to hybrid mode waveguide or feedhorn antenna comprising a waveguide body including a first section of uniform cross-section and a second section which for the waveguide comprises a uniform cross-section and for the feedhorn antenna flares outward towards the mouth of the feedhorn, and a spiro-helical projection bonded to a dielectric layer on the inner surface of the waveguide or feedhorn antenna comprising a helically wound, dielectrically coated wire structure which in the first section of the waveguide body changes guage in a decreasing manner in each of a plurality of sequential portions thereof as the structure progresses from the throat of the waveguide towards the second section and in the second section can comprise helical turns of uniform gauge wire or helical turns of decreasing gauge sections as the structure progresses from the first section to the mouth of the waveguide or feedhorn antenna.

2. Description of the Prior Art

Hybrid mode corrugated horn antennas have been in use in the microwave field for a number of years. Various techniques for forming the corrugated horn antennas have been used to provide certain advantages. For example, U.S. Pat. No. 3,732,571 issued to N. W. T. Neale on May 8, 1973 discloses a microwave horn aerial which is corrugated on its inner surface, defining a tapered waveguide mouth area, with at least one spiro-helical projection which can be produced by a screw cutting operation with a single start spiro-helical groove or by moulding on a mandrel which can be withdrawn by unscrewing it.

In U.S. Pat. No. 3,754,273 issued to Y. Takeichi et al on Aug. 21, 1973, a circular waveguide feedhorn is disclosed which includes corrugated slots on the inner wall surface, the width of the slots abruptly changing from a smaller value in the portion near the axis of the waveguide to a larger value in the remaining portion of the slot.

In U.S. Pat. No. 4,106,026 issued to N. Bui-Hai et al on Aug. 8, 1978, a corrugated horn of the exponential type is disclosed with corrugations whose depth increases exponentially from the throat of the horn towards its mouth.

In the typical prior art arrangements, construction is generally complicated and expensive with the possible exception of the Neale feedhorn described hereinbefore, and coupling to a dominate mode waveguide is difficult and limited in bandwidth.

The problem remaining in the prior art is to provide a hybrid-mode waveguide section or feedhorn of a design which is inexpensive to fabricate, provides simplified mode coupling of the $TE_{11}$ mode to the $HE_{11}$ mode, and is operative over a very wide frequency bandwidth.

SUMMARY OF THE INVENTION

The present invention solves the hereinbefore mentioned problems in the prior art and relates to hybrid mode waveguide or feedhorn antenna and, more particularly, to hybrid mode waveguide or feedhorn antenna comprising a waveguide body including a first section of uniform cross-section and a second section which for the waveguide comprises a uniform cross-section and for the feedhorn antenna flares outward towards the mouth of the feedhorn, and a spiro-helical projection bonded to a dielectric coating on the inner surface of the waveguide or feedhorn antenna comprising a helically wound, dielectrically coated wire structure which in the first section of the waveguide body changes gauge in each of a plurality of sequential portions thereof to the next smaller gauge as the structure progresses from the throat of the waveguide towards the second section, and in the second section can comprise helical turns of uniform gauge wire or helical turns of decreasing gauge sections as the structure progresses from the first section to the mouth of the waveguide or feedhorn antenna.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
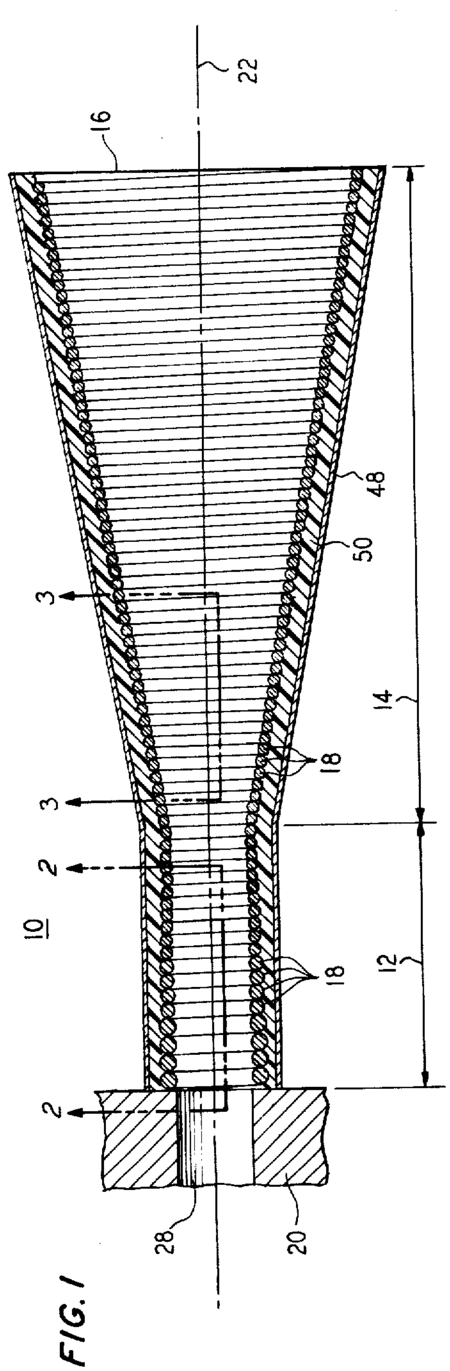
FIG. 1 illustrates a helical hybrid mode feedhorn antenna in accordance with the present invention.

FIG. 1 illustrates a helical hybrid-mode feedhorn antenna 10 formed in accordance with the present invention comprising a first waveguide mode transducer section 12 of uniform cross-section which converts to a tapered waveguide section 14 which is flared outward to form the mouth 16 of feedhorn antenna 10. A spiro-helical projection 18 is formed from a helically wound, dielectrically coated, wire, which is shown in greater detail in FIGS. 2–4, that is bonded to the wire surface of sections 12 and 14 with a dielectric layer 50. Feedhorn antenna 10 is shown coupled to a smooth-walled waveguide section 20, which is of a size that is capable of propagating the $TE_{11}$ mode in the frequency band of interest, in a manner that the longitudinal axis 22 of waveguide section 20 and feedhorn antenna 10 correspond.

Figure 2:
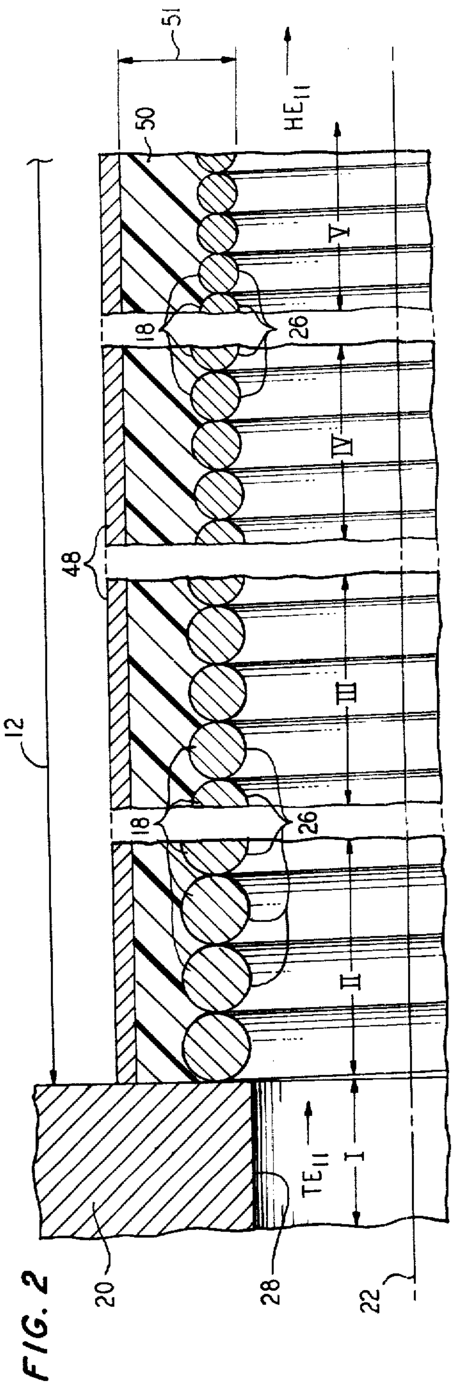
FIG. 2 illustrates an exploded view in cross-section of a portion of the first section of the waveguide body of the feedhorn antenna of FIG. 1 or the waveguide of FIG. 6 showing the spiro-helical projection in accordance with the present invention.

In accordance with the present invention, a suitable transition from the $TE_{11}$ mode to the $HE_{11}$ mode is obtained in section 12, and as shown in greater detail in FIG. 2, by starting the helical projection 18 adjacent waveguide 20, which is at the $TE_{11}$ mode end of section 12, with closely spaced helical turns of a dielectrically coated wire of a first gauge as, for example, 18 gauge. As shown in FIG. 2, after a number of turns of the exemplary 18 gauge wire in portion II, a number of closely spaced helical turns of a dielectrically coated wire of a second gauge smaller than the first gauge as, for example, a 20 gauge wire continue helical projection 18 in portion III. Portions IV and V of FIG. 2 illustrate that helical projection 18 in section 12 continues with closely spaced helical turns formed from dielectrically coated wire which reduce in gauge in each adjacent portion as, for example, 22 and 24 gauge wire, respectively.

The overall length of portions II to V in FIG. 2 is an arbitrary value and merely of sufficient length to provide a smooth transition area for continuity of the $TE_{11}$ mode between portion I in waveguide 20 and portion II in section 12 of feedhorn antenna 10, and mode conversion to the $HE_{11}$ mode in portions III to V. The edges 26 of the helical turns 18 should also be an extension of the inner wall 28 of waveguide 20 to avoid reflective surfaces for the propagating $TE_{11}$ mode signal. Once the mode conversion from the $TE_{11}$ mode to the $HE_{11}$ mode has been achieved in portions III to V of section 12 by the gradual reduction of wire guage in the closely spaced helical turns of projection 18, the remaining closely spaced helical turns of projection 18 in section 12 can be formed from a wire of the smaller gauge used in, for example, portion V or the last portion of the mode conversion area.

The use of a large gauge wire to form the helical turns in portion II of FIG. 2 substantially increases the capacitance between adjacent turns and, therefore, substantially reduces the coupling per wavelength of the propagating signal into the resonant chamber formed by the dielectric layer 50. The reduction in gauge of the wires in portions III to V alters the capacitance between adjacent turns in the successive portions in a manner to cause the mode conversion from the $TE_{11}$ mode to the $HE_{11}$ mode. The remaining portion in sections 12 and 14 provides primarily the proper conductive path for the $HE_{11}$ mode and the impedance match for launching the converted mode from mouth 16 of feedhorn antenna 16 into space.

Figure 3:
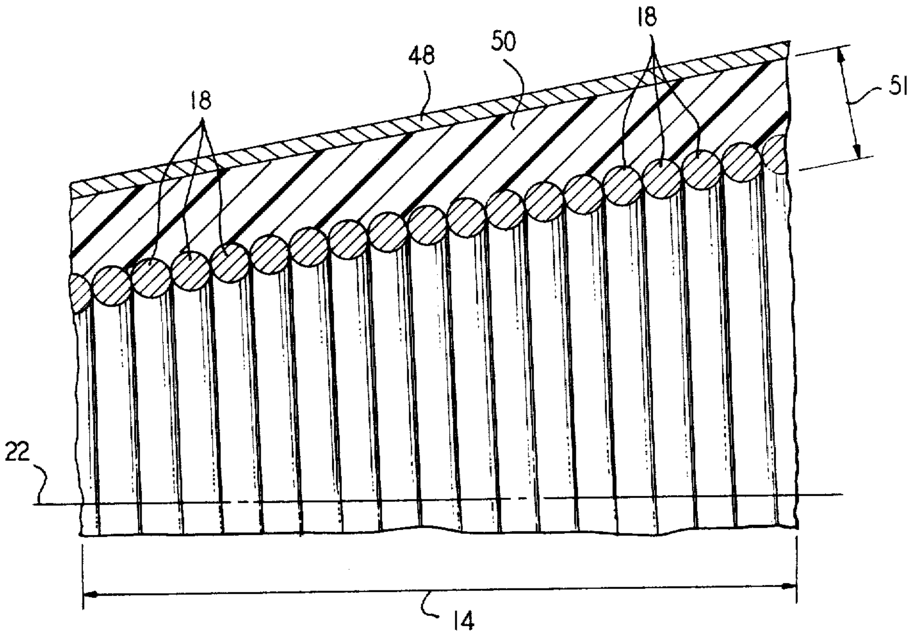
FIG. 3 illustrates an exploded view in cross-section of a portion of the flared section of the feedhorn antenna of FIG. 1 showing the projection comprising only helical turns of uniform gauge wire.
Figure 4:
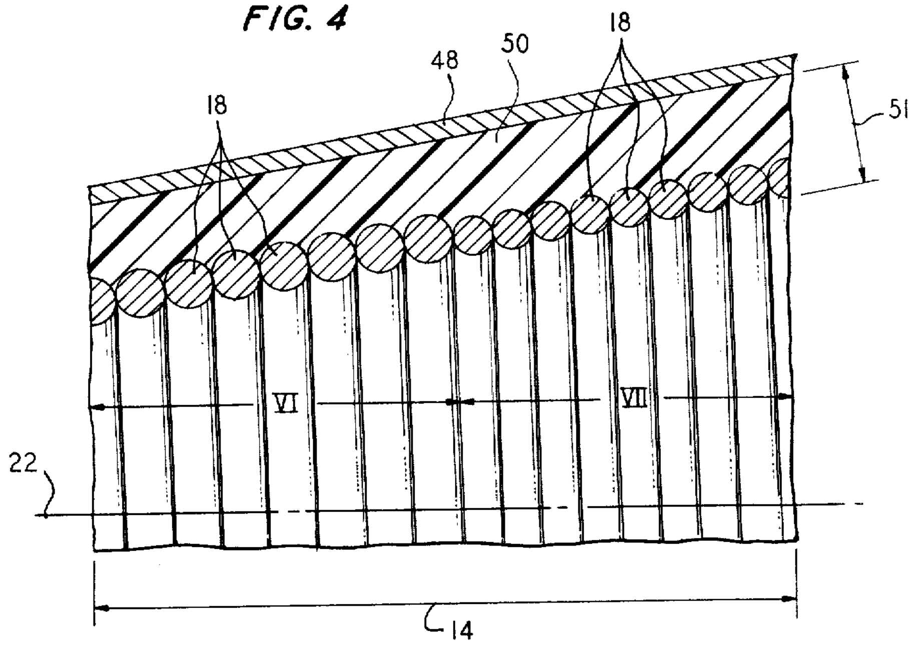
FIG. 4 illustrates an exploded view in cross-section of a portion of the flared section of the feedhorn antenna of FIG. 1 showing the projection comprising helical turns of wire which decrease in gauge in adjacent portions as the projection progresses towards the mouth of the feedhorn.

One method for forming the projection 18 in section 14 is shown in FIG. 3 where projection 18 is formed from a single gauge dielectrically coated wire with uniform pitch, closely spaced, helical turns. An alternative method for forming projection 18 in section 14 is shown in FIG. 4 where projection 18 can comprise portions, in section 14, which comprise dielectrically coated wire of a different gauge in each subsection which reduce in gauge between subsections as the helix progresses towards mouth 16. For example, in FIG. 4, portion VI may be formed from, for example, 26 gauge dielectrically coated wire and adjacent portion VII may be formed from 28 gauge dielectrically coated wire. A reason for providing an occasional reduction in wire gauge as the helix progresses towards the mouth 16 of the feedhorn antenna 10 is to achieve a smooth transition to obtain an ideal taper of the energy distribution at the mouth 16 of antenna feedhorn 10 in all planes in order to reduce wall currents that radiate sidelobe energy to a minimal value at the mouth 16 of feedhorn antenna 10.

Construction of the helical arrangement of FIGS. 1–4 can be accomplished by winding the different gauge wires on a suitable mandrel. When the helical turns have been completely formed, a uniform thickness homogeneous layer of dielectric material 50 is bonded to the wires and then enclosed in a conductive sheath 48. The combined thickness 51 of dielectric layer 50 and helix wires 18 capacitive loading should be approximately an electrical quarter wavelength at some intermediate frequency in the operating frequeny band. The outer sheath wall 48 can comprise any suitable conductive material. The final feedhorn antenna 10 structure can then be coupled to waveguide 20 by any suitable means as, for example, a flange (not shown).

Figure 5:
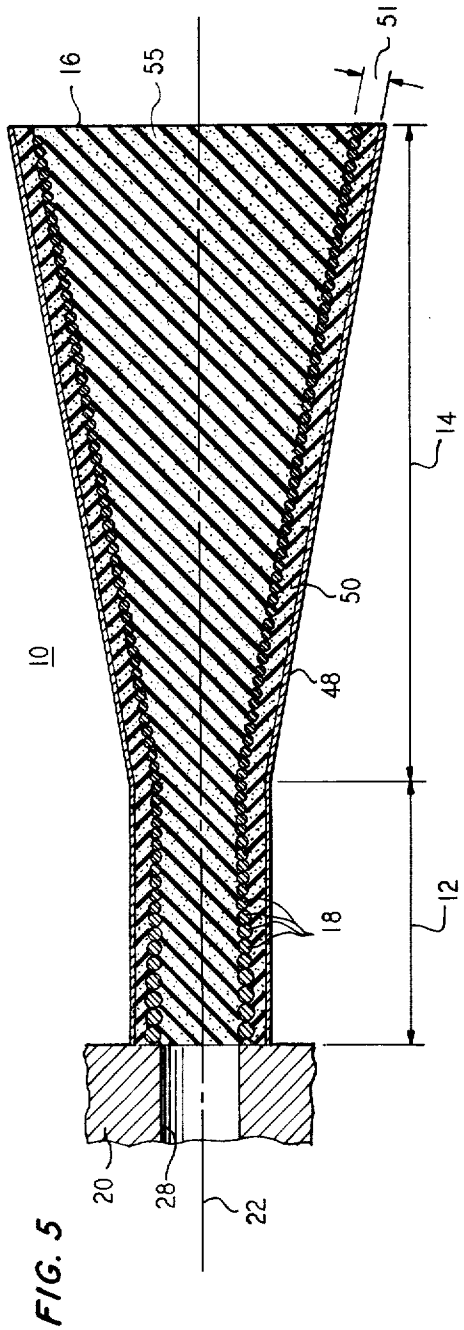
FIG. 5 illustrates a helical hybrid mode feedhorn antenna similar to FIG. 1 wherein the helical wire structure is supported in the center and bonded to the conductive sheath with a foam dielectric.

FIG. 5 illustrates an alternative method for constructing antenna feedhorn 10. In FIG. 5, the helical structure is formed of different gauge dielectrically coated wires as described hereinbefore for FIGS. 1–4. A layer 50 of foam dielectric is next deposited on the wire structure and the wire and foam layer 50 enclosed in a conductive sheath 48. To ensure the positioning of the helical wire structure once the mandrel has been removed, the central portion of feedhorn antenna 10 between the inner edges of the helical turns is filled with a dielectric foam 55 which has a permittivity which approximates the permittivity of the propagation medium in waveguide 20. For example, if air is the medium in waveguide 20 with a permittivity of 1.0, then the dielectric foam 55 should have a permittivity as close to 1.0 as possible.

Figure 6:
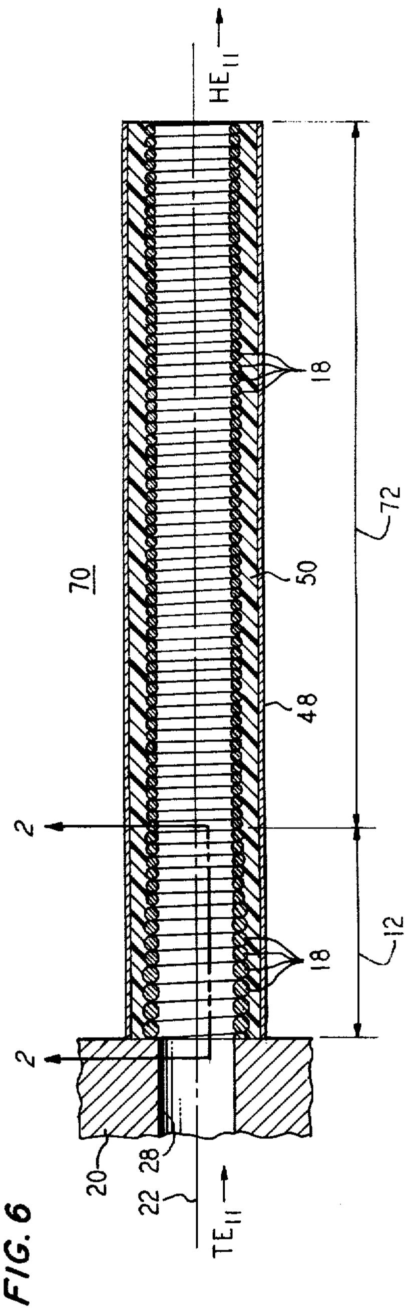
FIG. 6 illustrates a helical waveguide similar to the feedhorn antenna of FIG. 1 capable of converting the $TE_{11}$ mode to the $HE_{11}$ mode and supporting the latter mode in accordance with the present invention.

FIG. 6 illustrates a hybrid mode waveguide 70 formed in the same manner as shown in FIGS. 1–4 and described hereinbefore for feedhorn antenna 10 except that waveguide section 12 continues with the same uniform cross-section in section 72 as found in section 12 instead of converting to a flared section 14 as found in antenna 10. The waveguide 70, when completed in a manner similar to feedhorn antenna 10, is coupled between an entrance wavegude 20 and a utilization means (not shown).

Effecting a smooth transition between the $TE_{11}$ mode and the $HE_{11}$ mode requires that the boundary conditions on the inner wall of the waveguide be matched at the interface of the smooth walled waveguide 20 and the hybrid mode structure. These boundary conditions are best described by considering the normalized anisotropic wall susceptance defined below.

$$\left.\begin{aligned} Y_\phi &= jZ_oH_z/E_\phi \\ Y_z &= jZ_0H_\phi/E_z \end{aligned}\right\} \text{ at } r = a \qquad (1)$$

In equations (1) the cylindrical coordinate system is used where z is the direction of propagation, r=a is the radius at the inner wall of the waveguide, $E_\phi$ and $H_\phi$ are respectively the electric and magnetic components of the field polarized in the $\phi$ direction, and $E_z$ and $H_z$ are the field components polarized in the z direction. Those field components are functions of r, $\phi$ and z, and $Z_o$ is the free space impedance of approximately 377 ohms. In the smooth walled waveguide 20, the tangential electric fields are identically zero at the conducting surface, r=a, implying that in the $TE_{11}$ mode, $y_\phi = y_z = \infty$. In order that the pure hybrid mode, the $HE_{11}$ mode, propagate, the susceptance values required are $y_\phi = \infty$ but $y_z = o$. Therefore, a matching section is required such that $y_z$ gradually changes from a very large value $y_z > 1$ to a very small value $y_z < 1$ for a larger band of frequencies.

In the prior art corrugated feedhorns, the requirement on $y_z$ is met at the interface between the smooth walled waveguide and the corrugated horn matching section by standing waves in the slots. However, the bandwidth over which a good match is obtained is limited by the fact that the resonance in the slots is frequency sensitive. Ring-loading the corrugations as found in the Takeichi patent cited in the present Prior Art description adds a capacitance to the wall susceptance $y_z$ such that the condition that $y_z$ be large for a good match to the $TE_{11}$ mode is met for a much larger bandwidth. Since $E_\phi$ is required to go to zero at th teeth edges at $r=a$, $y_o=\infty$.

Using a helical winding in place of the teeth edges will also require $E_\phi$ to go to zero at $r=a$. However, the windings have been found to add a capacitance to $y_z$ much like ring-loading the teeth in a corrugated horn. A standing wave is set up in the space between the wires 18 and the conducting wall 48 as in the slots of a corrugated horn.

The wires are supported off the conducting wall by a dielectric material such as epoxy and the susceptance $y_z$ is directly proportional to the dielectric constant of the medium that supports the helical wires inside the conducting wall. While this fact helps to increase the bandwidth over which $y_z$ is large at the input to the hybrid mode matching section, it has the opposite affect at the output where it is desired that $y_z$ be small. As a consequence, the helical horn would have to have a larger aperture at the output than the corresponding corrugated horn. The feedhorn antenna 10 design of FIG. 5, however, would eliminate this probelm by using a dielectric foam with a very small relative permittivity to support the windings. This feedhorn antenna would then permit the same size aperture as a corrugated feedhorn.

It is to be understood that the above-described embodiments are simply illustrative of the principles of the invention. Various other modifications and changes may be made to those skilled in the art which will embody the principles of the invention and fall within the spirit and scope thereof as, for example, the use of a rectangular, square or circular sheath 48 configuration for any of the present designs.

I claim

1. A hybrid mode wavelength capable of converting a $TE_{11}$ mode signal entering at one port of the waveguide into a $HE_{11}$ mode signal comprising:
   a hollow waveguide body (48) comprising an inner surface
   characterized in that
   the waveguide further comprises:
   a helically wound wire structure (18) bonded to the inner surface of the waveguide body with a dielectric layer (50), said wire structure comprising a mode conversion section (II–V, FIG. 2) comprising a plurality of subsections formed of a layer of closely-spaced helical turns of dielectrically coated wires with each subsection of said mode conversion section comprising a different cross-sectional sized wire, the wire size between the subsections of the mode conversion section gradually decreasing as the helix progresses away from the $TE_{11}$ mode entrance port of the waveguide.

2. A hybrid mode waveguide in accordance with claim 1
   characterized in that
   any remaining section (72, FIG. 6) of the waveguide body following said mode conversion section comprises a layer of closely-spaced helical turns of dielectrically coated wire comprising a cross-sectional size which is no greater than the smallest cross-sectional size wire in said mode conversion means.

3. A hybrid mode waveguide in accordance with claim 1 or 2
   characterized in that
   the combined thickness of the wire layer (18) and the dielectric layer (50) bonding said wire structure to the inner surface of the waveguide being an approximate quarter wavelength at some intermediate frequency in the operating frequency band of the waveguide.

4. A hybrid mode feedhorn antenna comprising:
   a hollow waveguide body (48) including an inner surface and comprising a first section (12) of uniform cross-section which changes into a second section (14) that flares outward from one end of the first section to form a mouth of the feedhorn antenna
   characterized in that
   the feedhorn antenna further comprises:
   a spiro-helical projection (18, FIGS. 1-5) comprising a helically wound wire structure (18) bonded to the inner surface of the waveguide body with a dielectric layer (50), said wire structure comprising a mode convesion section (II–V, FIG. 2) comprising a plurality of subsections capable of converting a $TE_{11}$ mode signal into a $HE_{11}$ mode signal formed of a layer of closely-spaced helical turns of dielectrically coated wires with each subsection comprising a different cross-sectional sized wire with the wire size between the subsections of said mode conversion section gradually decreasing as the helix progresses from the other end of the first section towards the second section of the waveguide body, the remaining section (14) of the wire structure comprising closely-spaced helical turns of a dielectrically coated wire of a cross-sectional size no larger than the smallest size wire in said mode conversion section.

5. A hybrid mode feedhorn antenna in accordance with claim 4
   characterized in that
   said remaining section of the wire structure further comprising at least two subsections, each subsection including a different cross-sectional sized wire with the wire size between subsections decreasing as the helix progresses towards the mouth of the feedhorn antenna.

6. A hybrid mode feedhorn antenna in accordance with claim 4
   characterized in that
   said dielectric layer (50) bonding said wire structure to the inner surface of the waveguide body comprises a dielectric foamed material; and
   the feedhorn antenna further comprises a core of dielectric foamed material filling the area between the opposing inner edges of the helical turns of said wire structure, the dielectric foamed material having a permittivity which substantially corresponds to the permittivity of the medium adjacent said other end of the first section through which said $TE_{11}$ mode signal would enter the first section.

7. A hybrid mode feedhorn antenna in accordance with claim 4, 5 or 6 characterized in that the combined thickness of the wire layer (18) and the dielectric layer (50) bonding said wire structure to the inner surface of the waveguide being an approximate quarter wavelength at some intermediate frequency in the operating frequency band of the waveguide.

* * * * *